INVENTOR
PIERRE BERGONZO
By Irwin S. Thompson
ATTY.

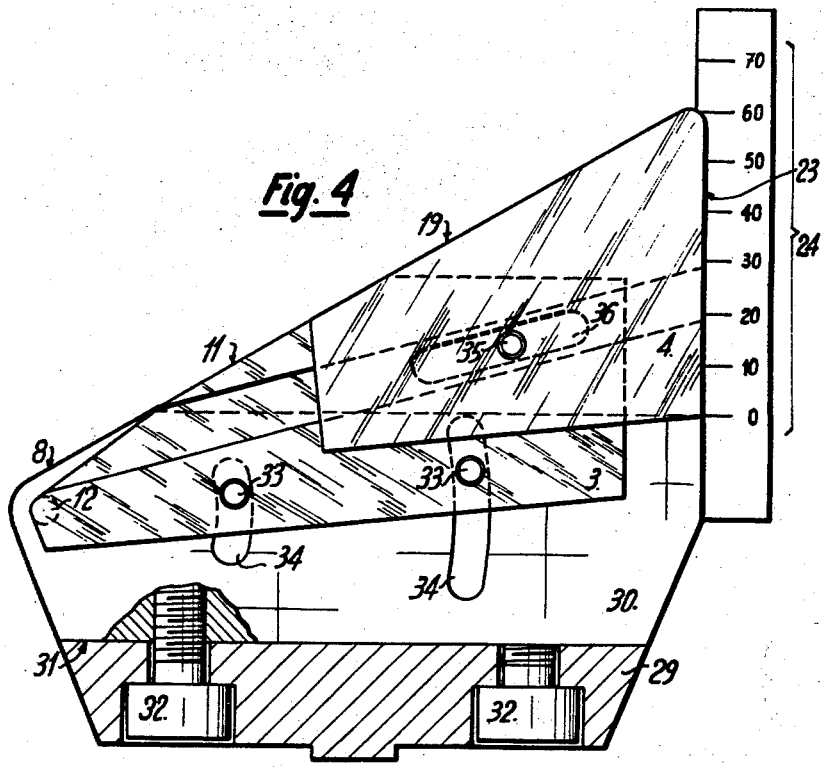
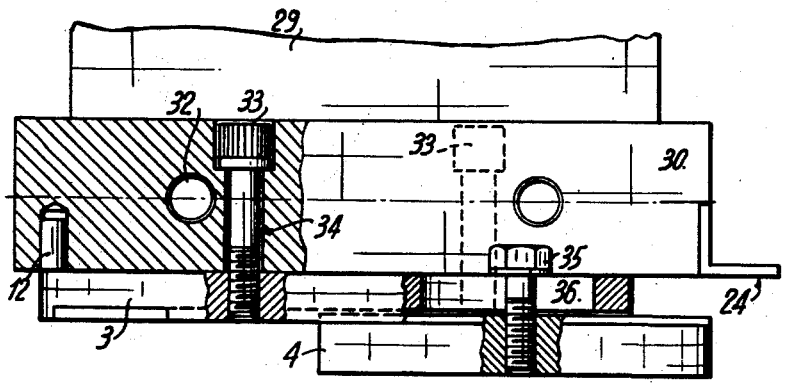

United States Patent Office 3,190,142
Patented June 22, 1965

3,190,142
FLAT CAM FOR THE POSITIVE MECHANICAL CONTROL OF A MOVABLE MEMBER OF AN AUTOMATIC LATHE
Pierre Bergonzo, 117 Route de la Capite, Cologny, Geneva, Switzerland
Filed Sept. 5, 1961, Ser. No. 136,063
Claims priority, application Switzerland, Oct. 7, 1960, 11,259/60
4 Claims. (Cl. 74—568)

The present invention has for its object a flat cam for the positive mechanical control of a mobile member of a machine-tool and more particularly of an automatic lathe which is constituted by two parts, each comprising a portion of the working profile of the cam, and the first one of which, carrying the second one, is angularly displaceable in its plane, in order to modify the slope of the profile, whereas the second one is displaceable with respect to the first one, so as to modify the length of the working profile, a fixing device being provided for fixing the relative positions of said first and second parts between each other and with respect to the driving shaft.

The annexed drawing shows schematically and by way of example two embodiments of a cam according to the invention, fixed on a polygonal drum constituting a control station of an automatic lathe.

FIG. 4 is a front view of the second embodiment of the cam.

FIG. 5 is a plan view partially in section of FIG. 4.

Figure 1:
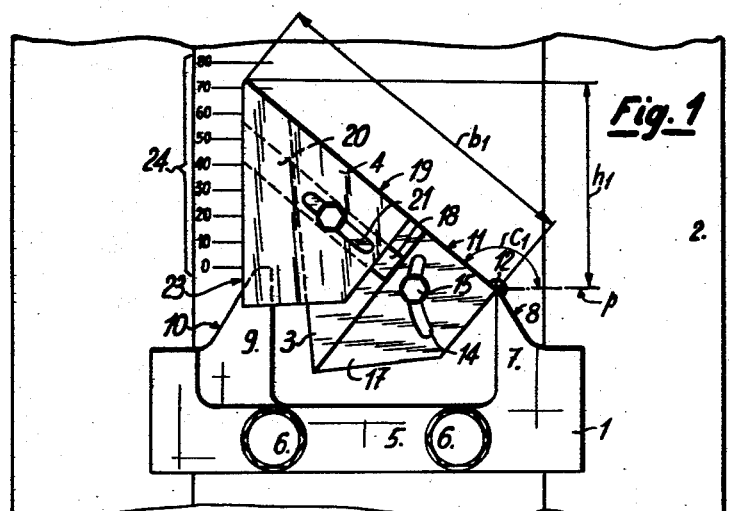
FIG. 1 is a plan view of the first embodiment, the cam being in a first position.

In the embodiments illustrated, the flat cam comprises a first part 3 angularly displaceable in its plane and a second part 4 carried by the first one and linearly displaceable with respect to the first part 3. In the first embodiment, the flat cam is rigidly fixed by means of a fixing device in a plane parallel to the rotation axis of a driving shaft of the cam, constituted for example by a polygonal drum 2 of a control station of an automatic lathe. A support 1, for the cam, fixed on the polygonal drum in a predetermined position, shows, in plan view, the general shape of a U the central portion 5 of which comprises two holes traversed by bolts 6. One of the wings 7 of the support 1 presents an entrance bench 8 intended to co-operate with a feeler actuating positively one of the mobile members of the lathe. The only wing 9 of the support 1 presents a thickness $a$ smaller than the thickness $b$ of said support and comprises an outlet bench 10 intended to co-operate also with the said feeler. The top face of said wing 9 constitutes a bearing surface for the second part 4.

The first part 3 is of general triangular shape and one of its sides forms a first portion 11 of the working profile of the cam. One of the extremities of said portion of the profile is located in the immediate vicinity of the extremity of the entrance bench of the support 1. This part 3 comprises a pivot 12 the axis of which is common with a straight line perpendicular to the surface of the part 3 and going through the extremity of the portion 11 of the profile situated in the vicinity of the extremity of the entrance bench 8. This pivot is engaged in a blind drill 13 provided perpendicularly to the surface of the polygonal drum 2 at the end of the portion 11 of the profile. This part 3 presents a slot 14 in form of an arc of circle co-axial to the pivot 12, and a guiding groove 18 is provided in its lower face parallelly to the portion 11 of the working profile.

The second part 4 presents the general shape of a quadrilateral, one side of which constitutes a second portion 19 of the working profile of the cam. This portion 19 is located in the same plane as the portion 11 of the working profile. The lower face of this second part 4 comprises a rib 20, engaged in the guiding groove 18 provided in the first part 3. The rib is parallel to the portion 19 of the working profile of the cam. A slot is provided in the axis of said rib on a certain length of it.

This second part 4 carries also a thrid portion 23 of the working profile of the cam constituted by one of the sides adjacent to the side constituting the second portion 19 of the working profile.

The fixing device enables the relative positions of the parts 3 and 4 to be chosen and fixed, as well as their positions with respect to the drum 2. This fixing device includes the bolts 6 passing through the holes provided in the central part 5 of the support 1 which are screwed into the drum 2, thus providing a rigid attachment of the the support 1 on this drum. A tightening member constituted by a bolt 15 engaged in the slot 14 of the part 3 is screwed in a tapped bore 16 provided in the drum 2. This tightening member 15 bears on a planed portion 17 of the top surface of the part 3 and applies the latter against the face of the drum 2. A fixing member for the second part 4, constituted by a bolt 22 passing through the slot 21, is screwed in a tapped bore provided in the first part 3.

In plan view, the profile of the cam described shows the general shape of a V, one wing of which is formed by the first portion 11 and the second portion 19 of the working profile, whereas the second wing of the V is formed by the third portion 23 of the working profile.

With the aid of the cam described herebefore, it is possible to modify the two principal parameters of the working profile, that is:

(a) The slope of the working profile, that is to say, the angle $c_1$, $c_2$ that this profile makes with a plane $p$ perpendicular to the axis of rotation of the drum on which the cam is fixed.

(b) The length of the working profile, that is to say, its length $b_1$, $b_2$ and thus the lift $h_1$, $h_2$.

Since the slope of the working profile determines the speed of displacement of the mobile member actuated and the lift of said profile defines the amplitude of the displacement of said mobile member, it is clear that the cam described may easily be adjusted in accordance with the machining operations to be performed. This results clearly from FIGS. 1 and 2 showing the adjustable cam in two different positions for which the slope and the length of the working profile are different.

Figure 2:
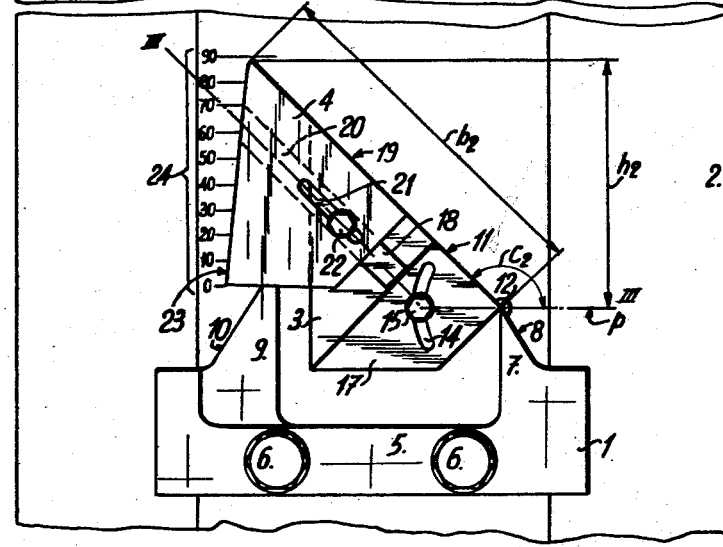
FIG. 2 is a plan view of the first embodiment, the cam being in a second position.
Figure 3:
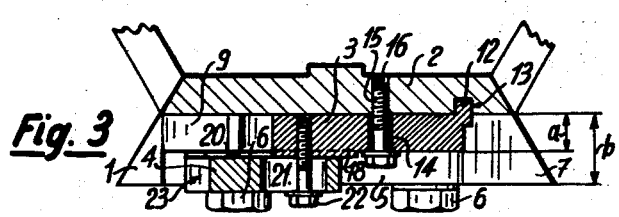
FIG. 3 is a section along line III—III of FIG. 2.

In order to pass from the position of the cam illustrated at FIG. 1 to the one shown in FIG. 2, the following operations are necessary:

(1) One loosens the tightening member 15 fixing the angular position of the cam with respect to the drum 2, then one causes said cam to pivot so that the portions 11 and 19 of the working profile form an angle $c_2$, instead of angle $c_1$, with the plane $p$ perpendicular to the axis of rotation of the drum 2. When the cam is in its new position, the tightening member 15 is tightened so as to fix the cam on the drum 2 in its new angular position.

(2) One loosens the fixing member 22 determining the position of the second part 4 with respect to the first part 3. When displacing said second part 4 linearly, by means of the slide 20, one adjusts then the length of the working profile to its new value $b_2$, whereupon the position of said second part 4 is again fixed by means of the fixing member 22 on the first part 3.

In order to facilitate this adjustment, a position indicating scale 24 is carried by each of the faces of the drum 2. This scale enables measurement of the projection of the length $b_1$, $b_2$ of the working profile which is a measure of the lift of the profile.

In the second embodiment illustrated in FIGS. 4 and 5, the flat cam constituted by the two parts 3 and 4 is fixed by means of a fixing device in a plane perpendicular to the axis of rotation of the driving shaft of the cam, that is a removable front face 29 of the polygonal drum 2.

In said second embodiment the support is constituted by a thick plate 30, one edge 31 of which is intended to be fixed on the outside face of the removable front face 29 by means of inside hexagonal head screws 32 for example. As in the first embodiment, the first part 3 pivots in its plane around the pivot 12 engaged in the support and carries a first portion 11 of the working profile. The second part 4 displaceable with respect to the first one carries the second portion 19 and the third portion 23 of the working profile of the flat cam. The first part 3 is fixed on the support by means of tightening members constituted by screws 33 engaged in slots having the form of arcs 34 circles concentric to the pivot 12 and screwed in the first part 3. The second part 4 slides by means of slides on the part 3 and is fixed on it in the desired position by means of a fixing member constituted by a screw 35 engaged in a slot 36 provided in the first part and screwed in the second part 4. The support carries also a scale 24 in order to facilitate the adjustment of the cam.

As in the first embodiment described, both the slope and the lift of the flat cam may be modified, chosen and fixed independently of each other.

The principal advantages of the adjustable profile cam according to the present invention with respect to the existing flat cams, are the following:

(1) Possibilities of easily adjusting the profile of the cam for the control of very diversified machining operations.

(2) Each of the cams carried by the control station controls only one unique machining operation, in contrast to existing flat cams, for example, the cams with multiple lobes for the control of the slide carrying the turret.

(3) Further in the first embodiment illustrated, the torque to which the driving shaft is subjected in the course of a cycle of machining operation is approximately constant.

In fact, during the whole period of a cycle of operations the point of contact of each feeler each mechanically coupled to a mobile member of the lathe, with the corresponding cam, is situated at the same distance from the driving shaft.

It is, from then, possible to produce strong cams which are able to withstand the great forces due to the rapid accelerations and decelerations of the slides bearing tools of a lathe of large capacity, that is to say those which can machine pieces of a diameter over 2¾ inches. But, until now, the capacity of automatic lathes with cams was limited through the fragility and the flexibility of the flat cams with many lobes.

Two embodiments of the cam with adjustable profile according to the invention have been described and illustrated, but it is evident that numerous variants could be foreseen without departing from the scope of the claimed protection.

Particularly, the support 1 could be omitted. In that case, the entrance 8 and outlet 10 benches would be carried by the parts 3 and 4 respectively. It is evident that the pivot 12 engaged in the blind bore 13 could be replaced by any other articulation enabling the first part 3 to pivot, in a plane parallel to the face of the drum on which it is fixed. Also, the tightening member 15 and the slot 14, as well as the fixing member 22 and the slot 21, could be replaced by equivalent devices for fixing the angular position of the first part 3 with respect to the drum 2 and the relative position of the second part 4 with respect to the first one respectively. The general shapes of the first and second parts and of the support could be different from those described and illustrated, as long as the working profile of the cam is approximately continuous. This profile could, however, be constituted by rectilinear or curved lines.

When the profile is curved, the second part 4 must naturally be displaceable with respect to the first part 3 parallelly to the said first and second portions of the working profile.

I claim:

1. A cam for the mechanical control of a mobile member of a machine tool, comprising support means including first cam means having a first cam working profile, second cam means having a second cam working profile which is a continuation of said first profile and is disposed at an angle greater than 90° to said first profile, means mounting said second cam means for rotation relative on and relative to said support means about an axis which is contiguous to the junction of said first and second profiles, means for releasably locking said second cam means in any of a plurality of positions of adjustment relative to said support means, third cam means having a third cam working profile which is a continuation of said second profile and which is disposed at an angle greater than 90° to said second profile, means mounting said third cam means on said second cam means for movement relative to said second cam means lengthwise of said second profile, and means for releasably locking said third cam means in any of a plurality of positions of adjustment relative to said second cam means.

2. A cam as claimed is claim 1, the adjacent ends of said first and second profiles coinciding with said axis.

3. A cam as claimed in claim 1, and fourth cam means fixed relative to said support and having a fourth cam working profile which is disposed endwise beyond the end of said third profile remote from said second profile.

4. A cam as claimed in claim 1, said second and third profiles being straight and coplanar and said means mounting said third cam means on said second cam means restricting movement of said third cam means to movement parallel to the common plane of said second and third profiles.

References Cited by the Examiner

UNITED STATES PATENTS

| | | | |
|---|---|---|---|
| 855,773 | 6/07 | Hanson | 74—568 |
| 868,086 | 10/07 | Hanson et al. | 74—568 |
| 1,430,852 | 10/22 | Roesch | 74—568 |
| 2,216,318 | 10/40 | Lewis | 74—568 |
| 2,606,610 | 8/52 | Collier | 74—568 X |

FOREIGN PATENTS 473,945   3/29   Germany.

BROUGHTON G. DURHAM, *Primary Examiner.*